United States Patent
Retter et al.

(10) Patent No.: US 7,568,623 B2
(45) Date of Patent: Aug. 4, 2009

(54) SYSTEM AND METHOD FOR TRANSFERRING INFORMATION FROM A PORTABLE ELECTRONIC DEVICE TO A BAR CODE READER

(76) Inventors: Dale J. Retter, 8635 E. Via de Cerro, Scottsdale, AZ (US) 85258; Keshav D. Bandekar, 4 Jeevan Saukhya, M. G. Road No. 2, Kandivali (W), Mumbai 400067 (IN)

(*) Notice: Subject to any disclaimer, the term of this patent is extended or adjusted under 35 U.S.C. 154(b) by 381 days.

(21) Appl. No.: 11/127,963

(22) Filed: May 12, 2005

(65) Prior Publication Data
US 2006/0255149 A1    Nov. 16, 2006

(51) Int. Cl.
G06K 7/10    (2006.01)
(52) U.S. Cl. .................. 235/462; 235/462.25
(58) Field of Classification Search ........... 235/462.01, 235/462.25, 462.1, 462.45, 462.46, 472, 235/470, 462.7
See application file for complete search history.

(56) References Cited

U.S. PATENT DOCUMENTS

| | | | |
|---|---|---|---|
| 5,682,030 A | 10/1997 | Kubon | |
| 6,082,620 A | 7/2000 | Bone | |
| 6,685,093 B2 * | 2/2004 | Challa et al. | 235/462.46 |
| 6,736,322 B2 | 5/2004 | Gobburu | |
| 2001/0039514 A1 | 11/2001 | Barenbaum | |
| 2002/0060246 A1 | 5/2002 | Gobburu | |
| 2002/0091571 A1 | 7/2002 | Thomas | |
| 2002/0111869 A1 * | 8/2002 | Shuster et al. | 705/23 |
| 2002/0145043 A1 | 10/2002 | Challa | |
| 2003/0023482 A1 | 1/2003 | Messner | |
| 2003/0057284 A1 | 3/2003 | Challa | |
| 2003/0058261 A1 | 3/2003 | Challa | |
| 2003/0200140 A1 | 10/2003 | Hars | |
| 2003/0230630 A1 | 12/2003 | Whipple | |
| 2004/0035925 A1 * | 2/2004 | Wu et al. | 235/380 |
| 2004/0107136 A1 | 6/2004 | Nemirofsky | |
| 2004/0117254 A1 | 6/2004 | Nemirofsky | |
| 2004/0117255 A1 | 6/2004 | Nemirofsky | |
| 2004/0122730 A1 | 6/2004 | Tucciarone | |
| 2004/0128197 A1 | 7/2004 | Bam | |
| 2004/0225560 A1 | 11/2004 | Lewis | |
| 2004/0232241 A1 | 11/2004 | Challa | |

* cited by examiner

*Primary Examiner*—Daniel St. Cyr
(74) *Attorney, Agent, or Firm*—Stoneman Volk Patent Group; Martin L. Stoneman; Michael D. Volk, Jr.

(57) ABSTRACT

A translator is provided for reading the bar codes displayed on the screen of a portable electronic device which utilizes a digital camera and/or a microphone responsive to tones from the portable electronic device to process and convert the information received from the camera and/or the microphone to a form readable by a reflective bar code reader without requiring any modification of the bar code reader.

4 Claims, 2 Drawing Sheets

SYSTEM AND METHOD FOR TRANSFERRING INFORMATION FROM A PORTABLE ELECTRONIC DEVICE TO A BAR CODE READER

BACKGROUND

Most of the bar code readers currently in widespread commercial use are designed to emit a beam of laser light which is swept across a target in a single or multiple scan. A detector, which is tuned to the same frequency as the emitter, is focused on the region being scanned or swept by the emitting beam of laser light. As the beam moves over a dark bar, the intensity of the signal received by the detector drops. As the beam moves over a bar which is lighter (preferably, white) the intensity of the received signal increases. This digital bright-dim or on-off sequence carries the recorded information, usually translated into a string of numbers. Black and white bars tend to generate the best differentiation in intensity, however, any high reflective color paired with a much lower reflective color will generally suffice.

Portable electronic devices, such as wireless cell phones, PDA devices, pagers, or combinations of these and other devices, are in widespread use. Most such portable electronic devices include a display screen for displaying information and pictures on them. Most electronic devices, and in particular cellular phones produced in volume for general use, employ screens designed primarily for viewing based on the light actively emitted by the screen, and not on reflected light.

In addition, the predominant technology employed in the manufacture of such screens is a back-lit LCD screen. A back-lit LCD screen employs multiple layers of polarizing material and liquid crystal filters to control the amount of light transmitted from an underlying light source as the light passes outwardly through a multitude of filtering layers. Because the emission of a bright line on part of this display does not necessarily correlate to an increase in surface reflectivity, and vice-versa, bands of light and dark are not consistently or accurately read by laser-based reflection sensing scanners. The multiple layers of materials used in back-lit LCD screens also produce strong reflections which are not effectively modified by changes in the underlying layers which produce the changes in the outwardly transmitted light. As a consequence, many bar code readers presently in commercial use at retail and point-of-sale operations are not able to accurately read visual images including a bar code pattern of bars or squares when such bar codes are displayed on the screen of a portable electronic device, such as a cell phone.

The ability of existing scanner systems to receive bar code information displayed on a cell phone screen, without alteration of the point of sale (POS) scanner systems themselves, is a commercially desirable goal.

DETAILED DESCRIPTION

Reference now should be made to the drawings, in which the same reference numbers are used throughout the different figures to designate the same or similar components. Promotional offers, coupons, tickets and other items used for carrying out promotional offers and retail or sporting event and travel functions typically have been carried out using paper. Coupons frequently are provided in weekly circulars or newspapers, or through promotional mailings for use by consumers. In addition, rebates, discounts and tickets for sporting events and travel typically have been handled by way of paper documentation. With the advent of the Internet or worldwide web, the ability to transfer and download coupons, promotional items and tickets to a computer or other personal electronic device is beginning to supplant and eliminate many paper coupon transactions for transactions taking place on the internet. However, the redemption of coupons electronically transmitted at conventional physical establishments (restaurants or "brick and mortar" stores) generally requires the electronically transmitted coupons to be physically printed on paper for presentation at the point of sale.

Whenever coupons, tickets or other items such as rebate information is transferred from some central control source to a portable electronic device such as a wireless cell phone, PDA, pager or combination of these, or other devices and functionalities having a display screen, the coupon, ticket or the like generally is identified by means of a conventional bar code display, either in whole or in part. The embodiments of the invention are directed to systems for facilitating the transfer of coupons or other bar code displayed items, such as a ticket or rebate, from the portable electronic device to a conventional point-of-sale laser scanner system.

Figure 1:
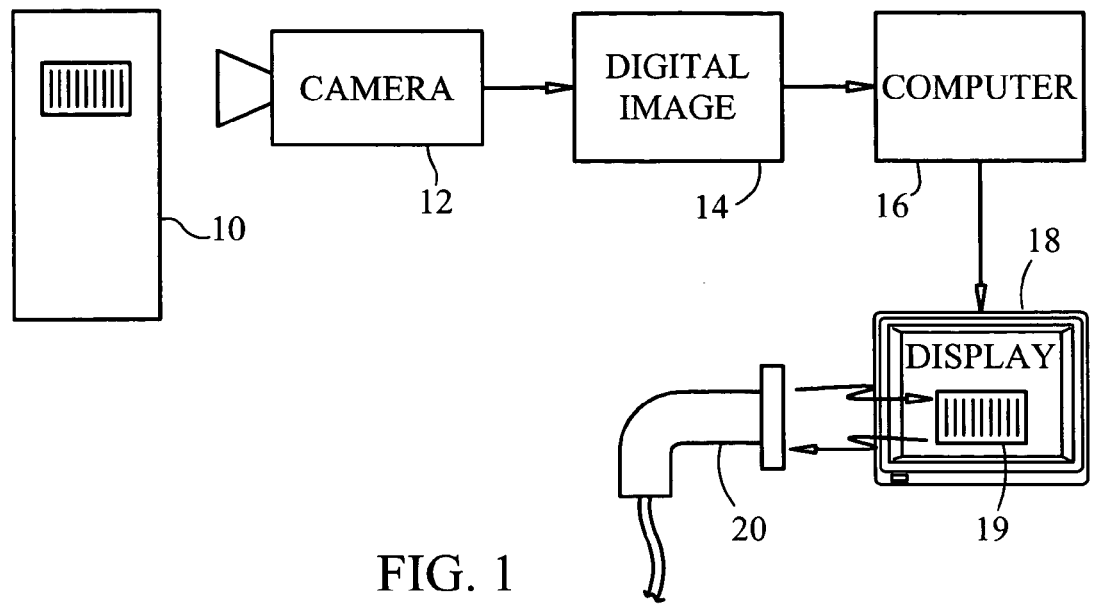
FIG. 1 is a block diagram of an embodiment of the invention.
Figure 2:
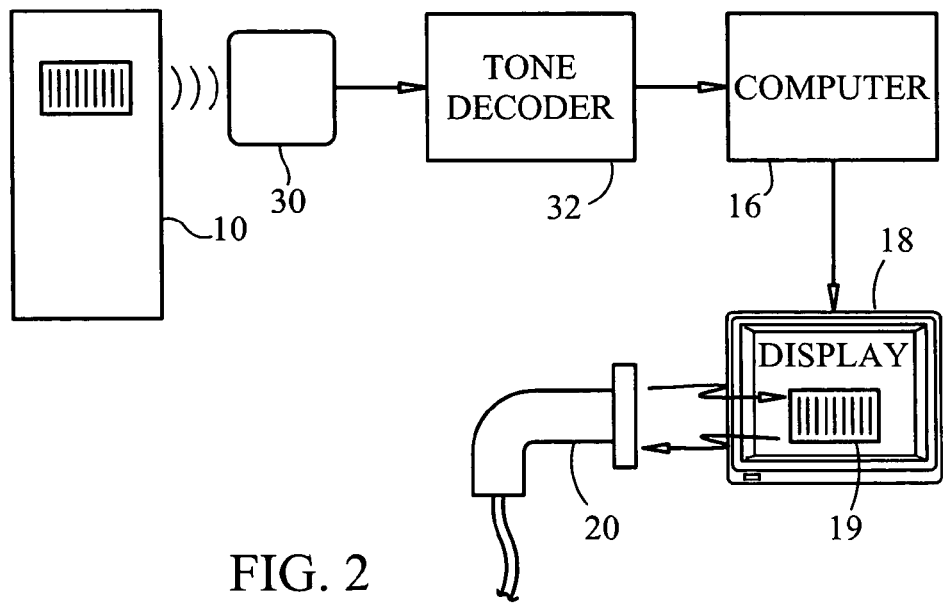
FIG. 2 is a block diagram of another embodiment of the invention.
Figure 3:
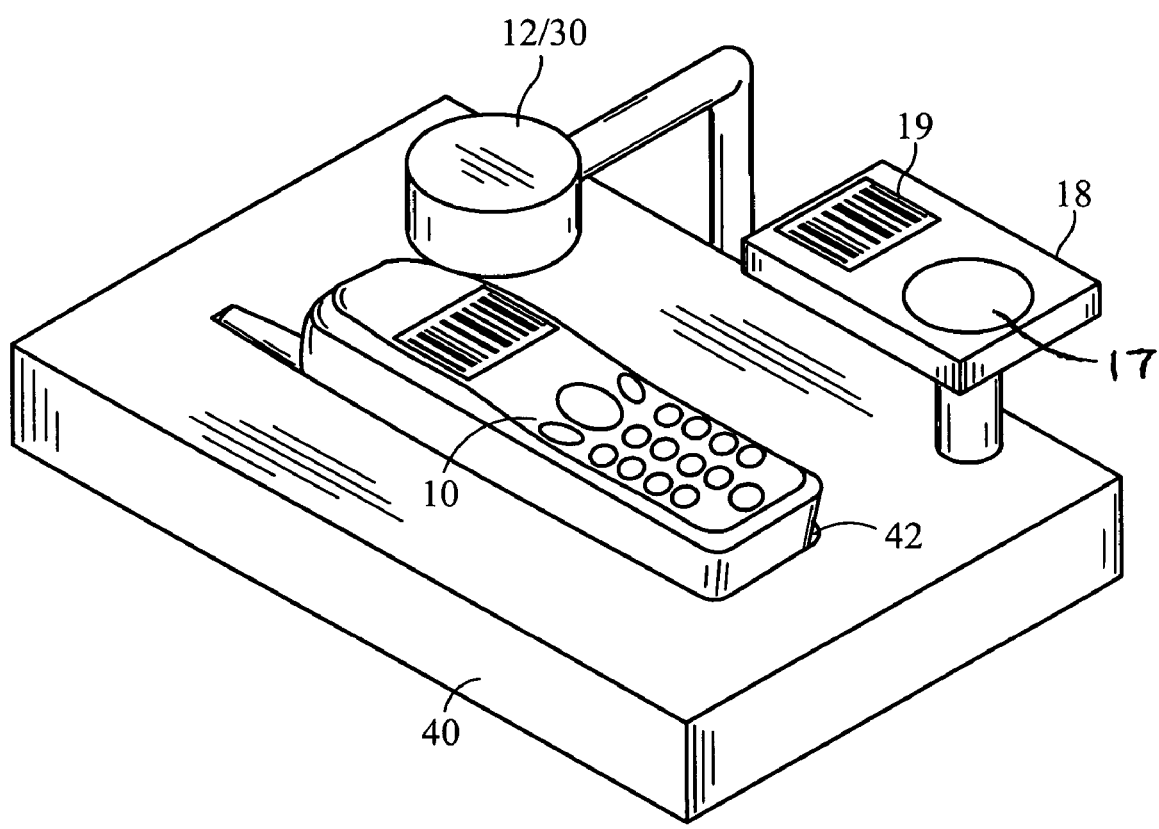
FIG. 3 is a perspective diagrammatic representation of the embodiments of FIGS. 1 and 2.

As noted above, the typical display used with a wireless portable electronic device is not one which accurately and consistently can be read by the conventional reflective bar code scanners which are in widespread use in retail establishments and other point-of-sale locations. The invention which is disclosed in FIGS. 1 through 3 is designed to permit the transmission of coupons or other bar coded information to a portable electronic device 10 for display on the screen of that device. No alteration in the manner of formulation, transmission, reception and display of this information is required; and the portable electronic device or cell phone 10 displays the bar coded information on a screen, producing it in a conventional manner.

As shown in FIG. 1, in order to allow the use of a conventional laser reflective bar code scanner or other type of conventional bar code scanners to obtain the data displayed on the screen of a cell phone or portable electronic device 10, a digital camera 12 is employed to capture a digital image of the bar code information which is displayed on the screen of the device 10. The camera 12 captures a digital image of the emissive image produced on the screen the cell phone 10 or other portable electronic device. Specifically, the digital image which is captured is able to detect light and dark bars or boxes used in bar code patterns.

The captured digital image 14 then is processed using known and commercially utilized techniques to decode the signal. This is accomplished through conventional means by a computer 16. This information, for a bar code image in the form of light and dark bars or black and white bars, then is supplied by the computer 16 to a display 18 as a regenerated bar code displayed on a screen 19, which is designed to be readable by a conventional laser reflective bar code scanner device 20. The screen 19 of the display 18 may be a reflected light LCD display, or any image display which is capable of providing reflective characteristics capable of detection by the conventional bar code scanner 20.

Alternatively as shown in FIG. 2, the system may be used to detect a sequence of tones emitted by the cell phone 10 or other portable electronic device. When this type of system is employed to detect tones, the device 10 is placed adjacent a microphone 30 to receive the tone sequence activated by the user. The tones which are received by the microphone 30 then are supplied to a tone decoder 32 of a conventional type to decode the tone sequence (either directly or in conjunction with a computer 16) and produce an alphanumeric or numeric sequence equivalent to the numerical sequence contained in a bar code sequence. The output of the tone decoder 32 is supplied to a computer 16, which once again receives the numeric or alphanumeric sequence and provides an output signal to the display 18 for regenerating the bar code to display the bar code on a screen or display area 19 designed to be readable by a conventional laser bar code reflective scanner device. The screen 19 shown in FIG. 2 is similar to or the same as the screen 19 in FIG. 1, and replaces the potential for erroneous readings which would be obtained if the bar code scanner 20 were to scan the screen on the portable electronic device 10 directly, without the intervening system which is shown in FIGS. 1 and 2.

FIG. 3 is a diagrammatic top perspective view of the physical configuration of apparatus which is used in conjunction with the systems of the type shown in FIGS. 1 and 2. In FIG. 3, a base unit 40 which typically includes the computer 16 shown in FIGS. 1 and 2, and which also may include the digital image processor 14 or the tone decoder 32 shown in FIGS. 1 and 2, constitutes a base unit for accommodating the other components of the system.

In the center of the base unit 40, there is a receptacle 42 which is configured to accommodate a portable electronic device, such as a cell phone 10. The cell phone 10, or other portable electronic device, is placed in the receptacle 42 to locate the screen of the device in close proximity to and aligned with a digital imaging camera or microphone 12/30 positioned to view (or pick up audio tones from) the area where the screen is located. The camera 12, when a camera is used in the device, is located to focus on the screen of the device 10 to capture a digital image of the screen. If a microphone 30 is used, either independently or in association with a camera, the microphone 30 is positioned and adjusted to receive the sequence of tone signals from the device 10 if an audible tone or output from the device 10 is employed.

The display unit 18, with its screen 19, is located adjacent the well 42 and spaced a slight distance from it, as illustrated in FIG. 3. The system operates as described in conjunction with FIGS. 1 and 2.

Alternatively, the code in the form of a decoded digital image effected by the digital image element of FIG. 1, or in the form of a decoded tone sequence, 2 may be retransmitted by a laser emitter in the form of a re-broadcaster 17 as part of the display unit 18. Such a re-broadcaster simulates a pulsed light return signal of the type produced when a laser scanner 20 scans across reflective and non-reflective bars. As a consequence, when the laser scanner 20 is pointed at the re-broadcaster 17, it receives the same sequence of pulses which would be received had the scanner 20 scanned a readable reflective bar code on the screen 19. The re-broadcaster 17 in such a case takes the place of a display screen 19, and is considered a full equivalent to such a display screen 19. Alternatively, the re-broadcaster 17 may include a separate light emitter (infrared or visible LED, for example) to produce light pulses readable by a conventional laser bar code scanner.

In common usage, a cell phone owner or owner of another portable electronic device downloads a coupon containing a bar scan code onto the cell phone or portable electronic device, utilizing existing cell phone telecommunications protocols for images and program instructions. Software installed on the user's cell phone then enables the user to call up and display this image at will. When the owner of the cell phone wishes to present the coupon for redemption at a point of sale or other verification point, the user places the cell phone 10 in the well 42 on top of the base unit 40, as depicted in FIG. 3. A clerk or operator at the retail establishment or point of sale then aims a conventional scanner device 20 at the decoder screen 19 (whether this is a display screen or a "re-broadcaster" 17), and either receives a transmitted signal (rebroadcast) of pulses that register as a conventional bar code scanned, or the scanner 20 scans the image 19 (or 17) as with any conventional bar code scanning on a product or paper coupon. The encoded information from the bar code then is transferred from the cell phone to the point of sale or verification equipment for subsequent use in the particular transaction which is employed.

The foregoing description of the embodiments of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A method for transferring information from a portable electronic device with a display screen to a form readable by a reflective bar code reader including: obtaining a digital image of the display screen of the portable electronic device; decoding the digital image; supplying the decoded digital image to a laser emitter re-broadcaster for simulating a pulsed return signal produced when a laser scanner sweeps a scanning beam across the re-broadcaster.

2. The method according to claim 1 wherein the portable electronic device is a cellular phone having a display screen.

3. The method according to claim 2 wherein obtaining the digital image is effected by photographing the display screen.

4. The method according to claim 1 wherein obtaining the digital image is effected by photographing the display screen.

* * * * *